United States Patent
Carlberg et al.

(10) Patent No.: US 6,737,451 B1
(45) Date of Patent: May 18, 2004

(54) THERMALLY STABLE, HIGH TEMPERATURE, SAMARIUM COBALT MOLDING COMPOUND

(75) Inventors: James Carlberg, Peoria, IL (US); Paul R. Nastas, Worcester, MA (US)

(73) Assignee: Arnold Engineering Co., Ltd., Marengo, IL (US)

(*) Notice: Subject to any disclaimer, the term of this patent is extended or adjusted under 35 U.S.C. 154(b) by 172 days.

(21) Appl. No.: 09/951,683

(22) Filed: Sep. 13, 2001

(51) Int. Cl.$^7$ ............................ C08K 9/02; C08K 3/10; C08K 5/098; H01F 1/24; H01F 1/147
(52) U.S. Cl. ............ 523/216; 523/205; 524/399; 524/400; 524/403; 524/404; 252/62.54; 252/62.55; 252/62.63
(58) Field of Search ................ 523/216, 205; 524/399, 400, 403, 404; 252/62.54, 62.55, 62.63

(56) References Cited

U.S. PATENT DOCUMENTS

| | | | |
|---|---|---|---|
| 4,264,361 A | 4/1981 | Yajima et al. | 75/230 |
| 4,272,285 A * | 6/1981 | Horimoto | 75/348 |
| 4,462,919 A | 7/1984 | Saito et al. | 252/62.54 |
| 4,497,722 A | 2/1985 | Tsuchida et al. | 252/62.54 |
| 4,876,305 A | 10/1989 | Mazany | 524/401 |
| 4,957,668 A | 9/1990 | Plackard et al. | 264/23 |
| 4,983,231 A | 1/1991 | Yamanaka et al. | 148/301 |
| 5,173,206 A | 12/1992 | Dickens, Jr. et al. | 252/62.54 |
| 5,186,766 A | 2/1993 | Iriyama et al. | 148/301 |
| 5,350,558 A | 9/1994 | Kawato et al. | 419/35 |
| 5,393,445 A | 2/1995 | Furuya et al. | 252/62.54 |
| 5,637,402 A | 6/1997 | Gay | 428/403 |
| 5,650,021 A | 7/1997 | Takahashi | 148/104 |
| 5,932,134 A | 8/1999 | Christ et al. | 252/62.54 |
| 5,958,283 A | 9/1999 | Schmid et al. | 252/62.54 |
| 6,206,982 B1 * | 3/2001 | Hughes et al. | 148/273 |

* cited by examiner

*Primary Examiner*—Tae H. Yoon
(74) *Attorney, Agent, or Firm*—Woodcock Washburn LLP.

(57) ABSTRACT

A magnetic compound is formed comprising: (1) 25% to 50% by volume of polyphenylene sulfide (PPS); (2) 50% to 70% by volume of coated samarium cobalt (the coating comprising 1 to 30% Kaolin by weight of the coating and 70 to 99% potassium silicate by volume of the coating); and (3) 0% to 5% by volume of an internal lubricant. The PPS polymer component of the compound renders the compound amenable to be injection molded to precise tolerances and also has a low coefficient of linear thermal expansion. The samarium cobalt constituent of the compound provides thermal stability. The potassium silicate/kaolin coating separates the PPS from the samarium cobalt, thus preventing degradation (i.e, PPS viscosity reduction) during manufacture.

15 Claims, 3 Drawing Sheets

THERMALLY STABLE, HIGH TEMPERATURE, SAMARIUM COBALT MOLDING COMPOUND

FIELD OF THE INVENTION

The present invention relates to the field of magnetic parts of the type used in a variety of industrial devices and other applications. More specifically, the invention relates to the field of magnetic parts exhibiting high performance characteristics in relatively high temperature environments.

BACKGROUND OF THE INVENTION

The number and type of applications for permanent, molded magnets have increased rapidly in recent years, particularly in such areas as computer peripherals, defense, and telecommunications. Recently, there has especially been a need for magnets that perform well in high temperature environments. For example, for D.C. motors, particularly those in satellite systems and small military applications, temperature stability during operation is vital.

In addition to the need for magnetic parts that exhibit favorable characteristics in high temperature conditions, it is also often desirable that magnetic parts be amenable to injection molding. Injection molded magnets can be formed cost effectively and can be formed to precise shapes and dimensions customized to particular applications.

Thus, there is a need for a magnetic compound that is both amenable to injection molding and that exhibits favorable characteristics in high temperature conditions. To address this need, various bonded magnets—i.e., magnets which are manufactured by mixing a plastic or rubber like material with magnetic powder and then transferring the mixture into a mold—have been developed using a high temperature magnetic material, such as samarium cobalt. The plastic or rubber material in these compounds provides such compounds with the ability to be shaped and molded, while the powder provides magnetic properties that vary little in high temperature environments.

However, in order for such bonded magnet compounds to perform in high temperature applications, not only the powdered magnetic material, but also the plastic or rubbery material must exhibit favorable characteristics in high temperature environments. To address this issue, polyphenylene sulfide (PPS) (which has a low coefficient of linear thermal expansion and excellent physical strength at high temperatures) has been used as the polymer constituent in bonded magnets.

Unfortunately, during injection molding of such magnets, the PPS is necessarily melted, and during this melt phase, samarium cobalt appears to catalyze a degradation (i.e., a viscosity reduction) of the PPS. Thus, the PPS, and therefore the entire compound, is rendered degraded and more difficult to mold (thus diminishing the benefit gained from adding the polymer constituent, i.e., the PPS, in the first instance).

To address this problem, other polymers have been used with samarium cobalt (or other high temperature magnetic materials) to form various magnetic compounds. As is the case in general, these polymers render the compounds amenable to injection molding and, further, the molding properties of these polymers are not degraded during manufacture. However, unlike PPS, such polymers do not exhibit favorable characteristics in high temperature environments.

Thus what is needed is a compound for magnetic parts exhibiting favorable characteristics in high temperature environments, that is amenable to injection molding and at the same time is not degraded during manufacture (melt phase) of the magnetic compound.

SUMMARY OF THE INVENTION

The present invention addresses this need. In particular, the present invention provides a high temperature bonded magnetic compound that can also be molded into complex shapes and that does not degrade when the polymer constituent is in its melt phase. To achieve these properties, the present invention exploits the unique performance characteristics of samarium cobalt magnetic powder and PPS polymer, each of which exhibit favorable characteristics at high temperature, and combines these substances in a compound that uses a relatively impermeable, inorganic coating to prevent the degradation of PPS in melt phase.

More specifically, the magnetic compound of the present invention comprises: (1) 25% to 50% by volume of polyphenylene sulfide (PPS) and/or possibly other polymers exhibiting favorable high temperature characteristics; (2) 50% to 70% by volume of coated, powdered magnetic material exhibiting high performance characteristics in high temperature environments, such as samarium cobalt (the coating comprising 1 to 30% kaolin by weight of the coating and 70 to 99% potassium silicate by weight of the coating); and (3) 0% to 5% by volume of an internal lubricant.

The PPS polymer component of the compound renders the compound amenable to injection molding to precise tolerances and also has a low coefficient of linear thermal expansion as well as excellent physical strength at temperature. The samarium cobalt constituent of the compound provides relatively high magnetic properties and thermal stability. At the same time, the potassium silicate/kaolin coating separates the PPS from the samarium cobalt during manufacture, thus preventing degradation during manufacture.

In accordance with another aspect of the present invention, the above described compound can be manufactured by: (1) blending high temperature magnetic materials, such as samarium cobalt; (2) coating the magnetic powder with kaolin/potassium silicate; (3) compounding the coated samarium cobalt with PPS and/or similar polymers and an internal lubricant; (4) granulating the compound; (5) injection molding the granulated compound; and (6) magnetizing the resulting molded pat. The result is a high temperature, bonded magnet that is injection molded to detailed specifications, exhibits strong magnetic force and is resistant to degradation during manufacture.

DETAILED DESCRIPTION OF PREFERRED EMBODIMENTS

Figure 1:
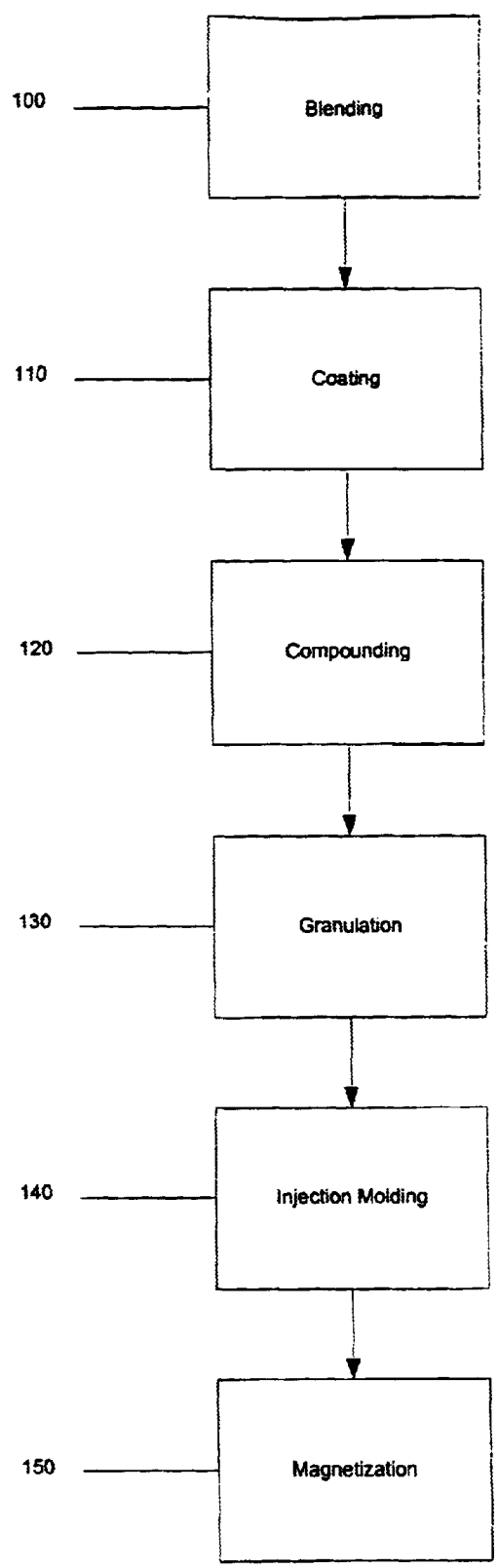
FIG. 1 is a flow chart depicting an injection molding process for forming a high temperature, degradation resistant samarium cobalt magnet in accordance with an embodiment of the present invention.

Various aspects of the present invention will now be described in greater detail with reference to the above referenced figures. In one aspect of the present invention, an improved method for manufacturing a high temperature bonded magnet is provided. In particular, turning to FIG. 1, it shows a flow chart of a process for forming a high temperature, degradation resistant bonded magnet in accordance with an embodiment of the invention.

Thus, in Step 100, in a preferred embodiment of the present invention, a manufacturer receives raw magnetic materials. The raw materials comprise Samarium Cobalt (SmCo) powder.

In Step 110, the Samarium Cobalt is coated with a protective covering comprised of Kaolin and Potassium Silicate. That is, the Kaolin and Potassium Silicate are mixed with water to form a solution. The mixture is then coated onto the Samarium Cobalt using any of a variety of coating techniques known in the art. The coating may be applied and cured in air or inert atmosphere.

Then, in Step 120, a magnetic compound is formed by mixing the coated Samarium Cobalt powder with a polymer material and a lubricant material using, for example, a twin screw compounding extruder. A polymer is any of a class of well-known substances comprising macromolecules that are multiples of simpler monomers. The polymer material used in the presently described embodiment is PPS. The lubricant used is zinc stearate or other similar materials.

After allowing for a mixing period in Step 130, the mixed compound is granulated (i.e., reduced to small particles). The granulation ensures consistent material flow in later processing. Since the compound includes a PPS constituent, the compound is amenable to further processing by injection molding. Accordingly, the compound can be molded to precise, complex shape specifications.

Thus, in Step 140, the granulated compound is fed into an injection-molding machine. Such machines may include a variety of horizontal, vertical and rotary molds depending upon the given application and the corresponding required dimensions, shape characteristics and field orientation characteristics of the magnet.

Finally, after injection molding, in Step 150, the molded parts are placed in magnetizing fixtures specifically made for the part size and shape. The magnetizing fixtures function to pulse magnetize the parts, resulting in the finished bonded magnet products.

An improved bonded magnetic product formed as described above addresses a variety of significant, currently existing commercial needs. Such a bonded magnet exhibits favorable characteristics in high temperature conditions and does not degrade during manufacture. The magnet may thus be used in such applications as D.C. Motors (where temperature stability is vital, such as, military use-satellite systems and small military motors), sensors, linear actuators and other growing automotive applications. Another benefit of such a magnet is that it can be injection molded to precise shapes and dimensions. A further benefit of injection molded magnets is that they can be molded against, into or onto other assembly components used in a given application, thus eliminating subsequent assembly steps. Such assembly simplification can be achieved by modifying the above described process using insert molding, known to those of ordinary skill in the art, in place of a standard injection molding process.

Figure 2:
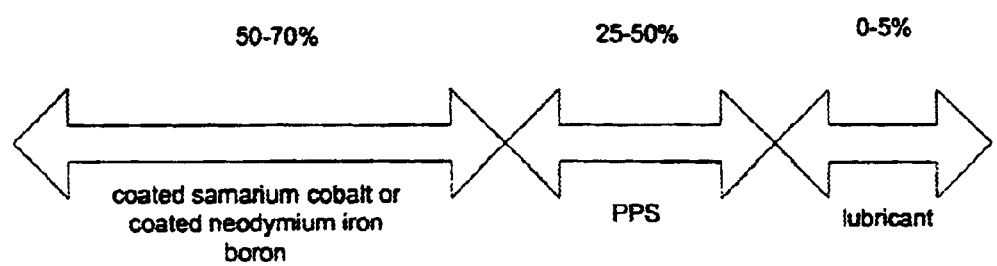
FIG. 2 depicts constituents of a magnetic compound in accordance with an embodiment of the present invention.
Figure 3:
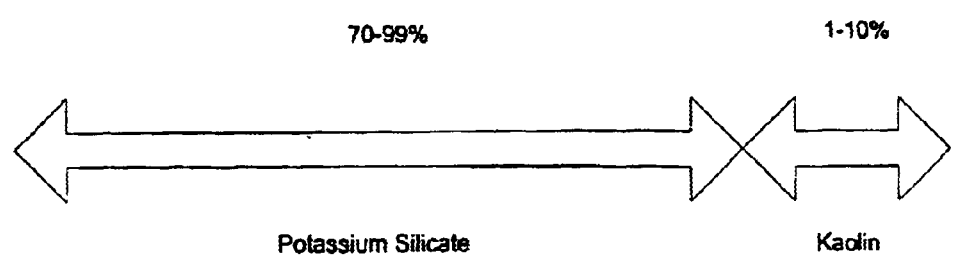
FIG. 3 depicts the constituents of a coating used in the magnetic compound depicted in FIG. 2 to prevent the degradation of the PPS constituent during melt phase of the manufacturing process shown in FIG. 1.

Having described a method for manufacturing an improved bonded magnet, the magnetic compound of the present invention is now described in greater detail. Turning now to FIG. 2, it shows constituents of a bonded magnetic compound in accordance with an embodiment of the present invention.

In particular, a preferred compound in accordance with the invention comprises: 1) 25% to 50% by volume of PPS or another polymer with good high temperature performance; (2) 50% to 70% by volume of coated magnetic material, such as samarium cobalt or other magnetic material exhibiting favorable characteristics in high temperature environments, the coating comprising 1–30% by weight of the coating Kaolin and 70–99% by weight of the coating potassium silicate; and (3) 0% to 5% by volume of an internal lubricant. In the presently described embodiment, the amount of coating used by weight as a percentage of the coated magnetic powder weight is 0.1% to 30%.

With respect to the polymer, it may be any polymer that exhibits favorable characteristics in high temperature conditions. PPS has so far been determined to be the polymer that optimally meets this criterion. For example, PPS has a very low coefficient of linear thermal expansion. That is, its fractional increase in length as a function of incremental unit temperature rise is relatively small. Thus, in high temperature applications, a magnetic part made using a PPS constituent is less likely to deviate from dimensions and tolerances optimized during manufacture.

During trials, described more fully below, it was determined that if the polymer (PPS) constituent is greater than the range specified above a 25–50% of the compound by volume), the larger amount of PPS comes at the cost of reducing the magnetic material amount, thus lowering the magnetic strength of the resulting compound and rendering it not commercially viable. If the polymer is less than the specified range, the resulting compound could not be properly injection molded.

With respect to the internal lubricant constituent of the compound, it is known in the art that such substances make the overall compound more amenable to processing. Zinc stearate has tested favorably as the lubricant constituent of the compound, but calcium stearate or other lubricant materials could be used as well. While the improved processing effects provided by the lubricant material of the present invention have not been tested concerning the compound of the presently described embodiment, such effects of lubricants are well known to those of ordinary skill in the art. It is similarly known that lubricants, including zinc stearate, improve magnetic performance through better orientation when an anisotropic magnetic material, such as samarium cobalt, is used. ("Anisotropic" compounds are those whose magnetic properties are dependent upon magnetic orientation). However, it is similarly generally known that if too much internal lubricant is used, the resulting compound will exhibit relative physical weakness inconsistent with many commercial applications.

With respect to the coated magnetic material, as a general matter, it should be clear to those of ordinary skill in the art that the amount of the coated magnetic material as a percentage of the total volume of the compound, and the type of magnetic material used, both affect the magnetic and physical properties of the magnetic part produced. In the compound of the presently described embodiment, Samarium Cobalt—either SmCo5 or Sm2Co17, both manufactured by Swift Levick Magnets—is chosen as the magnetic material constituent because of its favorable characteristics at high temperatures treater than 180 degrees Celsius). In particular, Samarium Cobalt generates a great deal of power while having a high Curie temperature (above 180 degrees Celsius) and low reversible temperature coefficients—0.030%/degree Celsius for Sm2Co17. (The Curie temperature is the temperature at which a material stops behaving as a magnet and a reversible temperature coefficient is the percentage change in a magnetic property as the temperature rises or falls). Thus, Samarium Cobalt exhibits relative thermal stability and can operate at high temperatures or in applications involving broad temperature ranges. Sensor applications, for example, require a stable magnetic field at high temperature and thus benefit from Samarium Cobalt's low reversible temperature coefficients.

By comparison, other likely candidates for the magnetic constituent exhibit relatively inferior characteristics in high temperature conditions. For example, although the Curie temperature for neodymium iron boron (NdFeB) is 310 degrees Celsius for 0% cobalt containing material and greater than 370 degrees Celsius for 5% cobalt containing material, some irreversible loss of output may be expected at even moderate temperatures due to oxidative damage. Thus, neodymium iron boron maximum use temperature is generally considered in the area of 150 to 200 degrees Celsius. NdFeB also exhibits a relatively high reversible temperature coefficient of induction.

Nevertheless, compounds based on neodymium iron boron materials could also benefit from this invention. Since neodymium iron boron suffers from oxidative damage, a reaction, at higher temperatures and the coating of the invention provides a barrier to reactions (such as that between PPS and samarium cobalt), this invention may similarly help neodymium iron boron to be used at higher temperatures.

Returning to the compound of the presently described embodiment, the samarium cobalt magnetic material is further coated with a Kaolin/Potassium Silicate. Kaolin, also referred to as "China clay", is known particularly in the ceramic arts. Potassium Silicate, which sometimes goes under the trade name "Kasil 1" from Philadelphia Quartz has a variety of known industrial applications, including protective and decorative coatings. In the presently described embodiment, Kasil 1 is used.

As noted earlier, the silicate based coating stops the degradation of PPS by samarium by isolating the samarium cobalt powder from the PPS. Surprisingly, the coating is durable enough to hold together during repeated molding and granulation cycles. The coating is also durable enough to withstand the high temperatures used during the processing of the PPS constituent as well as the work done to the compound during such processing.

It was determined in a series of trials that if the coated samarium cobalt constituent was greater than 50 to 70% of the magnetic compound by volume, the compound became too difficult to injection mold. It was similarly determined that if the coated samarium cobalt constituent was less than 50 to 70% of the magnetic compound by volume, the resulting material did not offer useful magnetic properties.

For example, trials, illustrated in the tables below, were conducted to optimize the load of a coated samarium cobalt powder in PPS. A coated samarium cobalt load of 65% of the magnetic compound by volume was set as an upper limit during this testing to reduce the amount of interaction between the samarium cobalt particles during compounding. It was felt that such interaction could harm the coating. This work showed that a volume load of 65-volume % of coated samarium cobalt could be safely used. Since the magnetic properties continued to rise with increasing amounts of samarium cobalt, higher loads may be possible. This work was done using a small, twin rotor laboratory compounder. The magnetic test specimens were molded with an orientation field in excess of 18 kOe.

| Property | 57 vol. % Coated Samarium Cobalt | 61 vol. % Coated Samarium Cobalt | 65 vol. % Coated Samarium Cobalt |
| --- | --- | --- | --- |
| Twin Rotor Speed (rpm) | 100 | 100 | 100 |
| Compounding Temperature (C.) | 280 | 280 | 280 |
| Compounding Time (min) | 8 | 8 | 8 |
| Br (Gauss) | 5300 | 5620 | 5850 |
| Hc (Oersteds) | 4360 | 4800 | 5100 |
| BHmax (MGOe) | 5.95 | 6.86 | 7.62 |

Trials, illustrated in the tables below, were also performed to optimize the kaolin and potassium silicate amounts within the coating. Two kaolin levels as a percentage of he coating weight, were tested versus the absence of a coating. The coating weight as a percent of the total coated powder weight was 3%. The compounds were tested for viscosity in the virgin state, meaning the first time the compounds had been processed. In addition, he tests were conducted at a shear rate near what is seen during injection molding (891/sec). The thus processed compounds were then ground up and tested again. Changes in the apparent viscosity of the PPS compound were used to judge improvements. (Normally, PPS compounds rise in viscosity during this sort of testing, except that when samarium cobalt catalyzes the degradation of the PPS, in which case a viscosity reduction is observe) From the trials and other information, it became apparent that coating reduces or, in the case of the 10% Kaolin-90% potassium silicate combination, completely eliminates the degradation.

| Property | 10 wt. % Kaolin/90 wt. % Potassium Silicate | 30 wt. % Kaolin/70 wt. % Potassium Silicate | Uncoated |
| --- | --- | --- | --- |
| Polymer Component | PPS | PPS | PPS |
| Magnetic Material Volume Load (%) | 63 | 63 | 63 |
| Internal Lubricant | None | None | None |
| Apparent Viscosity at 891/sec of the Virgin Compound (Pa-sec) | 300 | 704 | 292 |
| Apparent Viscosity at 891/sec of thc Reground Compound (Pa-sec) | 413 | 463 | 164 |
| Viscosity Change (%) | 37.7 | −34.2 | −43.8 |

Further trials, illustrated in the table below, were conducted to optimize the amount of coating to put on the samarium cobalt and to determine the proper curing conditions for the coating. This was done just as the first set of coating experiments reported above, with one exception. The materials were reground and reprocessed a total of four times. As can be seen from the following table, the results suggest the coating should preferably be cured at a relatively low temperature and that 3% coating weight as a percentage of the total coated powder weight is optimal. This combination results in a very stable compound. In these trials, the amount of Kaolin used was 5% of the coating by weight. No internal lubricant was used with the PPS and the coated samarium cobalt volume load was 65% of the magnetic compound by volume. Apparent viscosities were measured at a shear rate of 891/sec.

| Coating wt. % | 1.5 | 1.5 | 3.0 | 3.0 |
|---|---|---|---|---|
| Air Cure Temperature | 82 | 320 | 82 | 320 |
| Virgin Compound Viscosity (Pa-sec) | 641 | 730 | 771 | 838 |
| Regrind Generation 1 Viscosity (Pa-sec) | 491 | 482 | 819 | 789 |
| Viscosity Change from the Virgin State (%) | −23.4 | −34.0 | 6.2 | −5.9 |
| Regrind Generation 2 Viscosity (Pa-sec) | 525 | 499 | 743 | 722 |
| Viscosity Change from the Virgin State (%) | −18.1 | −31.6 | −3.6 | −13.8 |
| Regrind Generation 3 Viscosity (Pa-sec) | 535 | 491 | 793 | 762 |
| Viscosity Change from the Virgin State (%) | −16.5 | −32.7 | 2.9 | −9.1 |
| Regrind Generation 4 Viscosity (Pa-sec) | 759 | 470 | 717 | 840 |
| Viscosity Change from the Virgin State (%) | 18.4 | 35.6 | −7.0 | 0.2 |

While the invention has been described above in detail and with reference to specific embodiments thereof, it will be apparent to one skilled in the art that various changes and modifications can be made therein without departing from the spirit and scope thereof.

What is claimed is:

1. A magnetic compound comprising:
   a. 25% to 50% by volume of a polymer;
   b. 50% to 70% by volume of a magnetic powder covered with a coating, the coating comprising 1 to 30% kaolin by weight of the coating and 70 to 99% potassium silicate by weight of the coating; and
   c. 0% to 5% of an internal lubricant.

2. The magnetic compound of claim 1 wherein the polymer is polyphenylene sulfide.

3. The magnetic compound of claim 1 wherein the lubricant is one of zinc stearate or calcium stearate.

4. The magnetic compound of claim 2 wherein the magnetic powder is samarium cobalt powder.

5. The magnetic compound of claim 2 wherein the magnetic powder is neodymium iron boron.

6. The magnetic compound of claim 4 wherein about 65% by volume of the compound is comprised of the samarium cobalt covered with the coating.

7. The magnetic compound of claim 6 wherein the coating comprises about 10% Kaolin by weight of the coating and about 90% potassium silicate by weight of the coating.

8. The magnetic compound of claim 7 wherein the coating is about 3% by weight of the magnetic powder covered with the coating.

9. A magnetic compound comprising:
   a. 25% to 50% by volume of a polymer;
   b. 50% to 70% by volume of a magnetic powder comprising magnetic material covered with a coating, the magnetic material having a Curie temperature above 180 degrees Celsius, the coating comprising 1 to 30% kaolin by weight of the coating and 70 to 99% potassium silicate by weight of the coating; and
   c. 0% to 5% of an internal lubricant.

10. The magnetic compound of claim 9 wherein the polymer is polyphenylene sulfide.

11. The magnetic compound of claim 9 wherein the lubricant is one of zinc stearate or calcium stearate.

12. The magnetic compound of claim 10 wherein the magnetic material is samarium cobalt.

13. The magnetic compound of claim 12 wherein 65% by volume of the compound is comprised of the samarium cobalt covered with the coating.

14. The magnetic compound of claim 13 wherein the coating comprises about 10% Kaolin by weight of the coating and 90% potassium silicate by weight of the coating.

15. The magnetic compound of claim 14 wherein the coating is about 3% by weight of the magnetic material covered with the coating.

\* \* \* \* \*